United States Patent
Rotsaert

(10) Patent No.: US 11,238,245 B2
(45) Date of Patent: Feb. 1, 2022

(54) LOW-POWER SMART CARD READER

(71) Applicant: Ingenico Inc., Alpharetta, GA (US)

(72) Inventor: Christopher Rotsaert, Boston, MA (US)

(73) Assignee: Ingenico Inc., Alpharetta, GA (US)

( * ) Notice: Subject to any disclaimer, the term of this patent is extended or adjusted under 35 U.S.C. 154(b) by 0 days.

(21) Appl. No.: 16/443,049

(22) Filed: Jun. 17, 2019

(65) Prior Publication Data

US 2019/0384943 A1 Dec. 19, 2019

Related U.S. Application Data

(60) Provisional application No. 62/686,362, filed on Jun. 18, 2018.

(51) Int. Cl.
*G06K 7/00* (2006.01)

(52) U.S. Cl.
CPC .................................. *G06K 7/0069* (2013.01)

(58) Field of Classification Search
CPC .................................................. G06K 7/0069
USPC ................................................. 235/441, 380
See application file for complete search history.

(56) References Cited

U.S. PATENT DOCUMENTS

| | | | | |
|---|---|---|---|---|
| 5,877,483 A * | 3/1999 | Bilich | ..................... | G06F 21/34 235/380 |
| 6,581,122 B1 * | 6/2003 | Sarat | ..................... | G06K 7/0008 235/375 |
| 6,616,050 B1 * | 9/2003 | Oki | ..................... | G06K 7/0021 235/441 |
| 8,794,535 B2 | 8/2014 | Marseille et al. | | |
| 9,836,626 B1 | 12/2017 | Edwards | | |
| 2002/0105234 A1 * | 8/2002 | Ruat | ..................... | G06K 7/0013 307/139 |
| 2004/0226999 A1 | 11/2004 | Ruat et al. | | |
| 2008/0230609 A1 * | 9/2008 | Singh | ..................... | G06F 9/4411 235/441 |
| 2010/0023789 A1 * | 1/2010 | Lee | ..................... | G06F 1/3203 713/321 |

(Continued)

FOREIGN PATENT DOCUMENTS

| | | | |
|---|---|---|---|
| EP | 0762307 A2 | 3/1997 | |
| EP | 0803831 A2 | 10/1997 | |

(Continued)

OTHER PUBLICATIONS

Extended European Search Report for Application No. EP 19180593.6 dated Mar. 19, 2020 (9 pages).

(Continued)

*Primary Examiner* — Allyson N Trail

(74) *Attorney, Agent, or Firm* — Nutter McClennen & Fish LLP

(57) ABSTRACT

In exemplary embodiments, a reader device is powered on only when a card is inserted in the reader device, thereby reducing the amount of time the reader device is powered and consequently reducing the amount of power consumption by the reader device. In some embodiments, inserting the card causes power-on of the reader device, while in other embodiments, insertion of the card plus other criteria are required to power on the reader device (e.g., having the reader device connected to the host device, or operating a manual switch while the card is inserted in the reader device).

21 Claims, 8 Drawing Sheets

(56) References Cited

U.S. PATENT DOCUMENTS

| | | | |
|---|---|---|---|
| 2010/0033310 A1* | 2/2010 | Narendra | G06K 19/07732 340/10.51 |
| 2010/0193586 A1* | 8/2010 | Iwashima | G03G 15/5004 235/380 |
| 2012/0293136 A1* | 11/2012 | Chen | G06F 1/266 320/162 |
| 2013/0205178 A1* | 8/2013 | Partee | G11C 29/08 714/718 |
| 2016/0239691 A1 | 8/2016 | Wade et al. | |
| 2019/0304222 A1* | 10/2019 | Nakabayashi | G07C 9/28 |

FOREIGN PATENT DOCUMENTS

| | | | |
|---|---|---|---|
| EP | 0762307 A3 | 5/2000 | |
| EP | 0803831 A3 | 8/2000 | |
| JP | S6093676 A | 5/1985 | |

OTHER PUBLICATIONS

Canadian Office Action for Application No. CA 3046748 dated Sep. 14, 2020 (5 pages).
European Office Action for Application No. 19180593.6 dated Dec. 15, 2020 (3 pages).

* cited by examiner

FIG. 1 – PRIOR ART

LOW-POWER SMART CARD READER

CROSS-REFERENCE TO RELATED APPLICATION(S)

This patent application claims the benefit of U.S. Provisional Patent Application No. 62/686,362 entitled LOW-POWER SMART CARD READER filed Jun. 18, 2018, which is hereby incorporated herein by reference in its entirety.

FIELD OF THE INVENTION

The present invention relates generally to a power-on sequence for a smart card reader.

BACKGROUND OF THE INVENTION

Today, small and medium sized businesses (SMBs) often use mobile point-of-sale (mPOS) devices to perform transactions and accept payments such as from credit cards, debit cards, mobile wallets, etc. For example, an SMB may utilize a reader device that communicates with a host device such as a smartphone or tablet computer. The reader device may include a magnetic stripe reader (MSR) for accepting various types of magnetic stripe cards, a chip reader for accepting so-called smart cards (e.g., Europay MasterCard Visa or EMV cards), a contactless reader (e.g., a near-field communications or NFC reader for accepting various types of contactless payment vehicles such as Apple Pay), and/or other types of readers such as, for example, a camera or scanner such as for reading a bar-code or QR-code. The reader device may communicate with the host device such as by USB, Bluetooth, audio jack, lightning, Wi-Fi, infrared, cellular, or other communication technology.

In the early days of mPOS for SMB in the US market, solutions were mostly based on magnetic stripe readers having ultra-low power microcontrollers and connected to the host device by the audio jack. Many such reader devices relied on power from the host device (e.g., in the form of audio signals or other power signals provided by the host device allowing the reader device to charge a capacitor or other electrical storage device such as a battery) or from a non-rechargeable battery allowing hundreds or thousands of transactions over several years. As a major benefit for the merchants, the reader devices were ready for use without having to worry about charging the reader devices.

With the introduction of EMV capability, it is not practical for reader devices to rely on power from the host device or from a non-rechargeable battery because these devices consume a great deal of power. Therefore, EMV-capable reader devices typically include a rechargeable battery such as a rechargeable Li-Ion battery. Beyond the self-discharge of such technology, the lifecycle of a transaction exacerbates high power consumption of these reader devices. For example, a typical transaction lifecycle for the card reader includes running a start-up sequence typically including communications with the host device, idling while awaiting card insertion, reading information from the card when it is inserted, processing the transaction once the card was inserted including communications with the host device, and waiting for transaction completion on the back-end to be returned to the card reader. In order to control power consumption by such card readers, it is common for the card reader to include a power-on button or other mechanism to turn on the card reader in advance of the transaction and for the card reader to be turned off after completion of the transaction. Still, it is not uncommon for SMB merchants (especially those that do not perform frequent transactions) to find that their card readers are not sufficiently charged to accept transactions, thereby requiring that the SMB merchant charge the reader device for several minutes at a time when they want to accept payments.

In order to enable faster transactions, all of the major card brands (e.g., Visa, MasterCard, American Express, and Discover) have introduced a "Quick Chip" or similar online transaction mode that allows the card to be inserted, read, and removed without the need for the final transaction amount to be available in advance and without the need for the card reader to receive approval from the back-end before instructing the customer to remove the card.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

In exemplary embodiments, a reader device is powered on only when a card is inserted in the reader device, thereby reducing the amount of time the reader device is powered and consequently reducing the amount of power consumption by the reader device. In some embodiments, inserting the card causes power-on of the reader device, while in other embodiments, insertion of the card plus other criteria are required to power on the reader device (e.g., having the reader device connected to the host device, or operating a manual switch while the card is inserted in the reader device).

Figure 1:
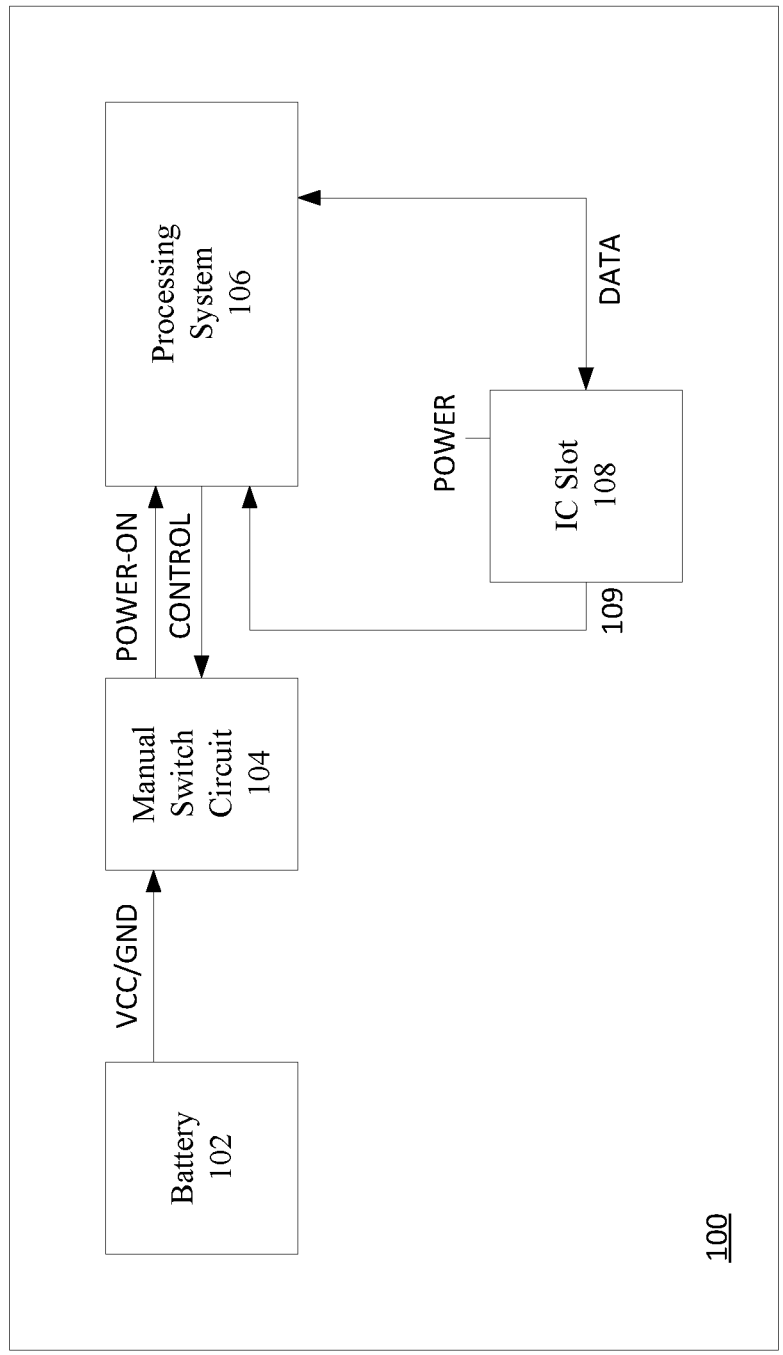
FIG. 1 is a schematic block diagram of a reader device 100 in which power-on is initiated by a manual power switch, as known in the art.

FIG. 1 is a schematic block diagram of a reader device 100 in which power-on is initiated by a manual power switch, as known in the art. Among other things, the reader device 100 includes a battery 102 or other power source, a manual power switch circuit 104, a processing system 106, and an IC slot 108.

Figure 2:
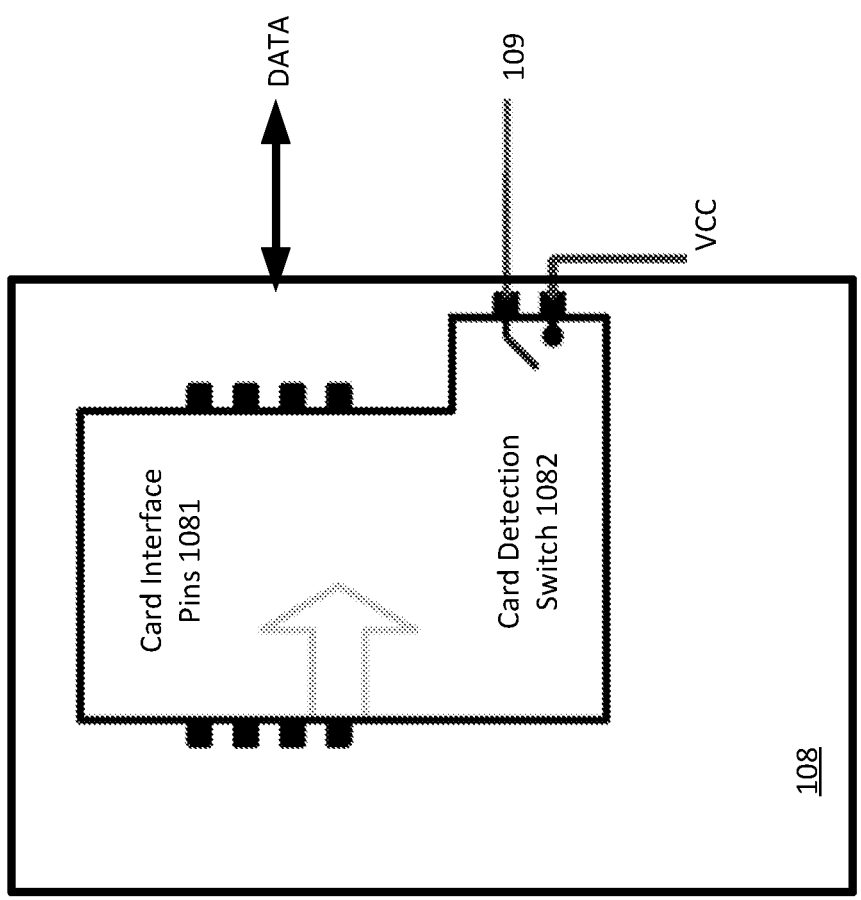
FIG. 2 is a schematic diagram showing relevant components of an exemplary IC slot 108 that can be used in the reader device 100 of FIG. 1, as known in the art.

FIG. 2 is a schematic diagram showing relevant components of an exemplary IC slot 108 that can be used in the reader device 100 of FIG. 1, as known in the art. Here, the IC slot 108 includes a set of eight (8) card interface pins 1081 that are configured to interface with corresponding pins of the smart card chip when the smart card is inserted in the IC slot 108 (the arrow shows the direction of card insertion). The card interface pins also are coupled to the processing system 106 via the DATA interface so that the processing system 106 can read card data from the smart card chip. The IC slot 108 also includes a card detection device 1082, which in this example is a normally-open switch that is closed when the smart card is inserted in the IC slot 108. The card detection device 1082 provides a signal 109 that essentially indicates whether or not a card is inserted in the IC slot 108, e.g., based on whether the card detection switch is open (i.e., no card inserted, signal 109=0) or closed (i.e., card inserted, signal 109=VCC). The card interface pins 1081 and the card detection device 1082 may be parts of an integrated card connector component or may be separate components, e.g., attached separately to a printed circuit board. The IC slot 108 typically also includes guides (not shown) that help to position the smart card within the IC slot 108 when the smart card is inserted in the IC slot 108.

Figure 3:
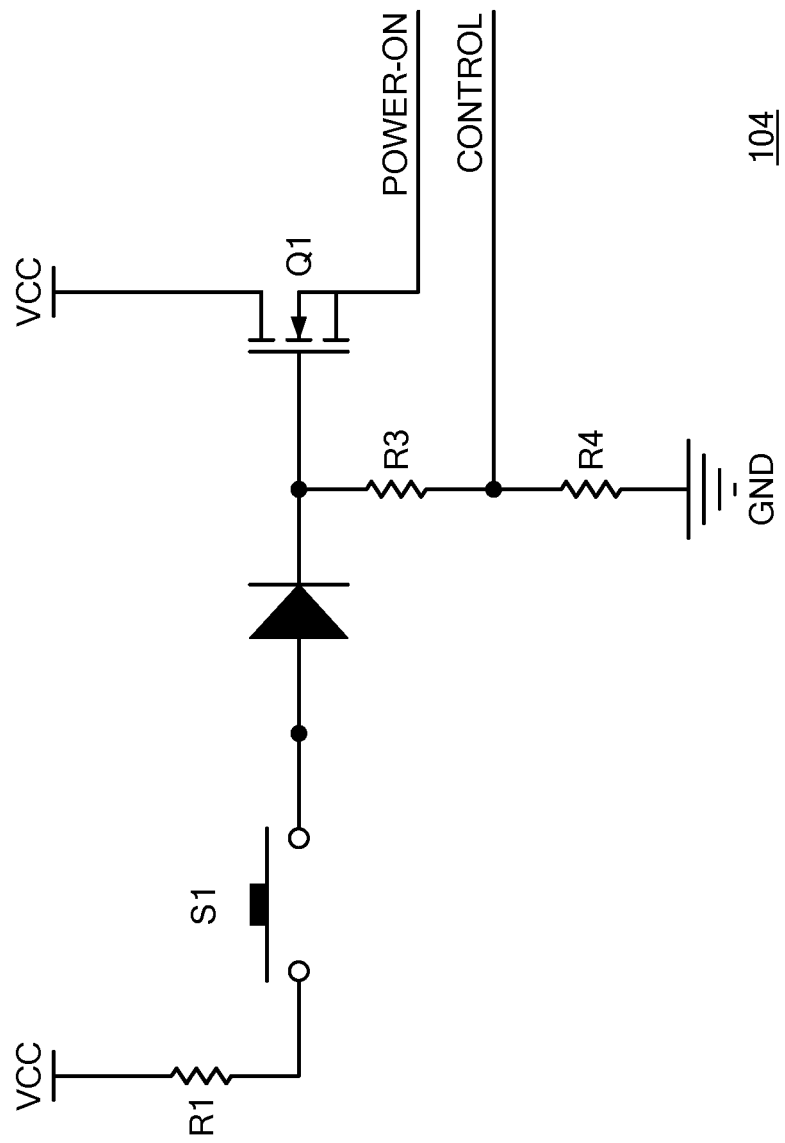
FIG. 3 is a schematic diagram showing relevant components of an exemplary manual power switch circuit 104 that can be used in the reader device 100 of FIG. 1, as known in the art.

FIG. 3 is a schematic diagram showing relevant components of an exemplary manual power switch circuit 104 that can be used in the reader device 100 of FIG. 1, as known in the art. Here, the manual power switch circuit 104 includes, among other things, a momentary normally-open push-button switch (S1) and additional power management circuitry that is controlled by the processing system 106 or other appropriate circuitry to maintain power for the processing system 106 and other peripherals (e.g., the IC slot 108). When the switch S1 is pressed/closed, current flows through resistor R1 and through the diode to the control input of transistor Q1 to provide a POWER-ON signal to the processing system 106. Upon receiving the POWER-ON signal, the processing system 106 or other appropriate circuitry provides a CONTROL signal to the control input of transistor Q1 to maintain the POWER-ON signal even if the switch (S1) is subsequently released/opened. Typically, the processing system 106 can turn off the reader device by turning off the CONTROL signal. For example, the CONTROL signal may be a software-controllable output pin of a microcontroller of the processing system 106, in which case the reader device can be turned off by software control.

Thus, with reference to FIGS. 1-3, the user of the reader device 100 can operate the manual power switch circuit 104 to provide a POWER-ON signal to the processing system 106. Then, with regard to smart card transaction, the processing system 106 can determine, based on the signal 109, whether or not a card is inserted in the IC slot 108. When a card is inserted in the IC slot 108, the processing system 106 can read data from the card and can transmit card data to the host device via a host interface (not shown), if the reader device 100 is connected to the host device, or in some embodiments can store the card data in a memory of the processing system 106 for later transmission to the host device. The processing system 106 also can detect when the card has been removed from the IC slot 108.

Figure 4:
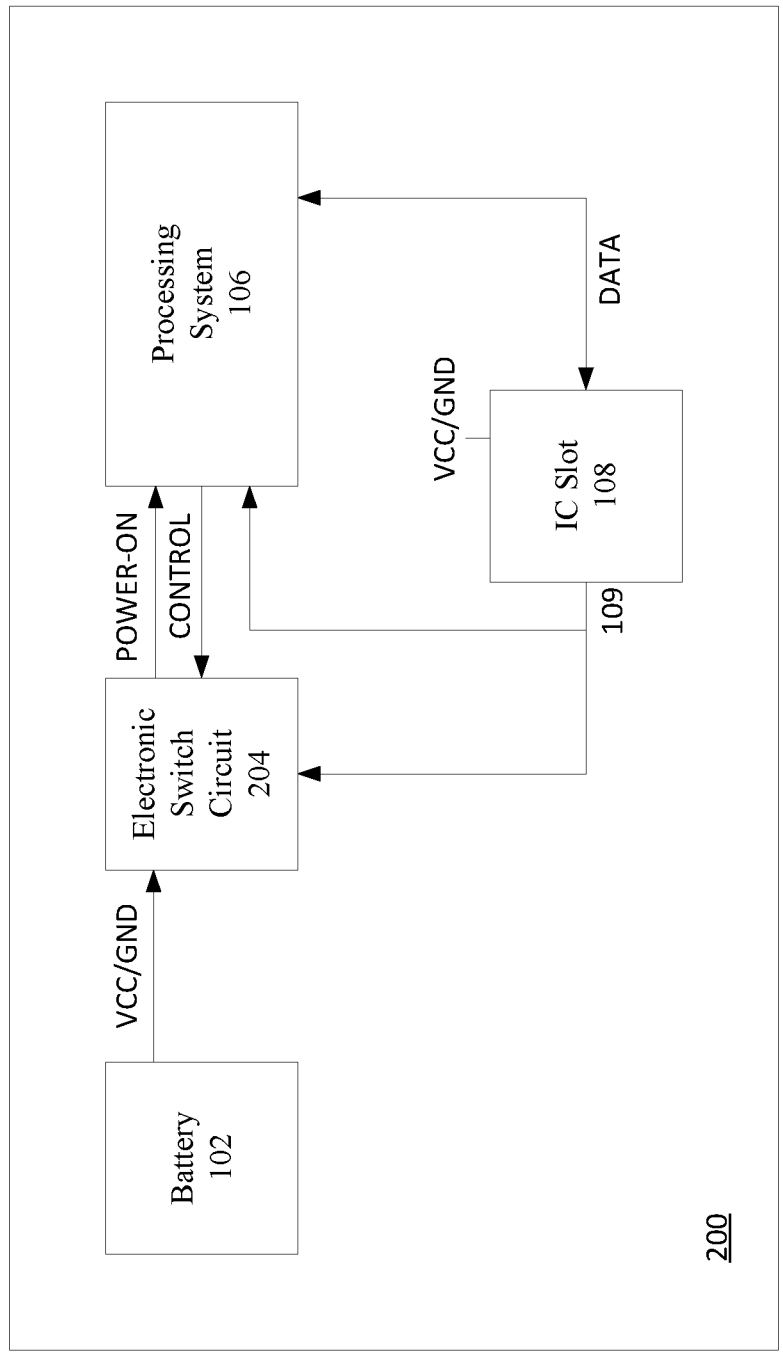
FIG. 4 is a schematic block diagram of a reader device 200 in which power-on is initiated by insertion of a card in the IC slot, in accordance with a first exemplary embodiment.
Figure 5:
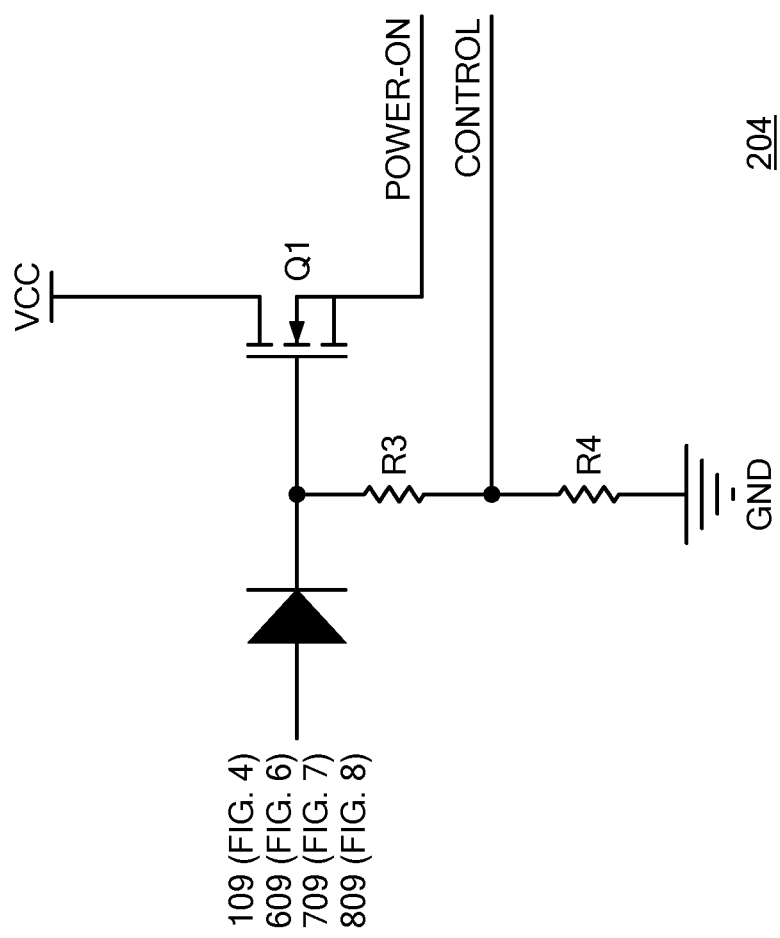
FIG. 5 is a schematic diagram showing one example of an electronic power switch circuit 204 that can be used in various embodiments of the invention.

FIG. 4 is a schematic block diagram of a reader device 200 in which power-on is initiated by insertion of a card in the IC slot, in accordance with a first exemplary embodiment. Here, power is provided to the normally-open card detection device 1082 of the IC slot 108 such that, when a card is inserted in IC slot 108 and the card detection device 1082 is closed, signal 109 is generated to operate electronic power switch 204 and provide a power-on signal to the processing system 106. In essence, the signal 109 replaces the momentary normally-open push-button switch (S1) of the manual power switch circuit 104 of FIG. 3, for example, as shown in FIG. 5. Then, the processing system 106 can determine, based on the signal 109, whether or not a card is inserted in the IC slot 108. When a card is inserted in the IC slot 108, the processing system 106 can read data from the card and can transmit card data to the host device via a host interface (not shown), if the reader device 200 is connected to the host device, or in some embodiments can store the card data in a memory of the processing system 106 for later transmission to the host device, e.g., if the card reader is not connected to the host device or the host device is not ready to receive the card data.

Figure 6:
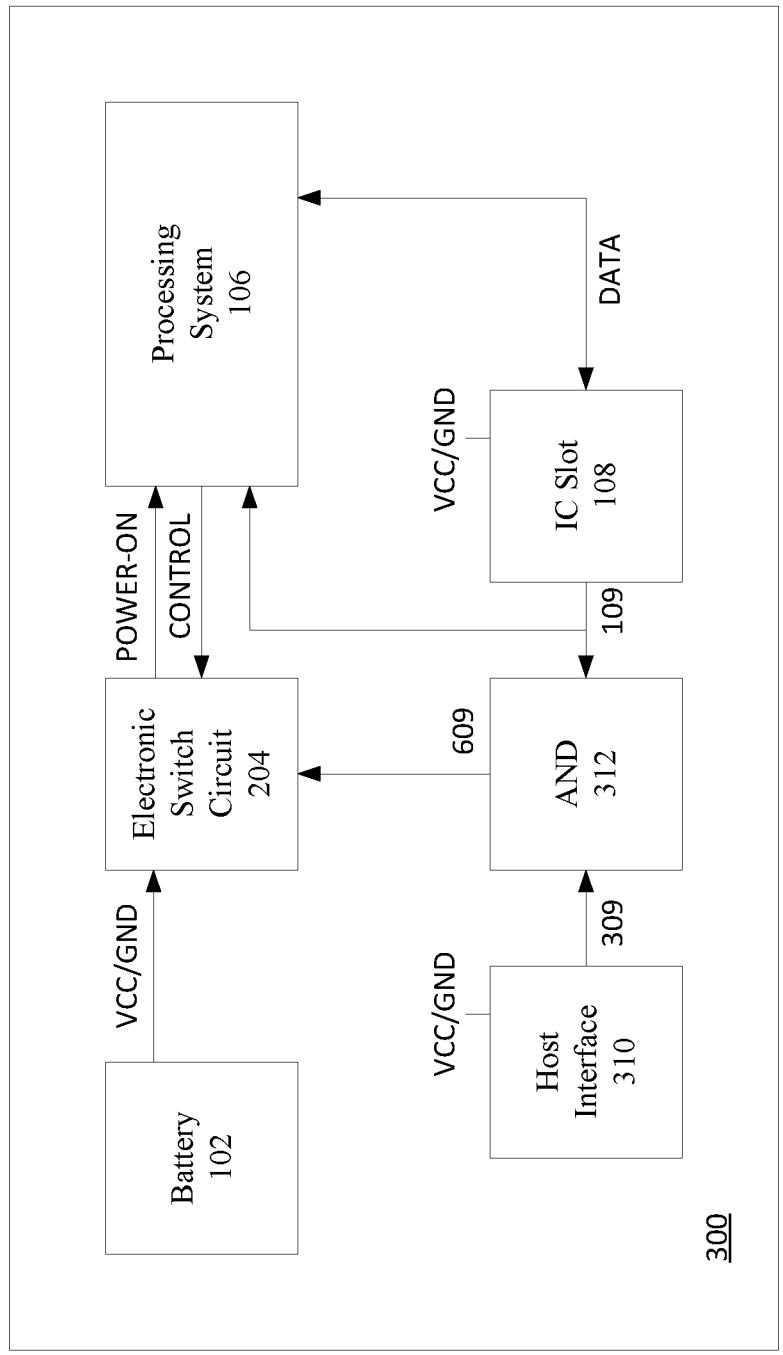
FIG. 6 is a schematic block diagram of a reader device 300 in which power-on requires both insertion of a card in the IC slot and connection of the reader device 300 to the host device, in accordance with a second exemplary embodiment.

FIG. 6 is a schematic block diagram of a reader device 300 in which power-on requires both insertion of a card in the IC slot and connection of the reader device 300 to the host device, in accordance with a second exemplary embodiment. Here, as in FIG. 4, power is provided to the normally-open card detection device 1082 of the IC slot 108 such that, when a card is inserted in IC slot 108 and the card detection device is closed, signal 109 is generated. Separately, the host device can provide a signal 309 when the reader device is connected to the host device via host interface 310 (e.g., through the audio jack, lightning jack for iOS devices, USB, etc.). For example, host device may provide a signal when it is ready to receive card data from the reader device 300 (e.g., sent automatically by a transaction app on the host device when the transaction app is open and waiting to receive the data from reader device). Signals 109 and 309 are provided to an AND circuit 312. When both signals 109 and 309 are present, signal 609 is generated to operate electronic power switch 204 and provide a power-on signal to the processing system 106. In essence, the signal 609 replaces the momentary normally-open push-button switch (S1) of the manual power switch circuit 104 of FIG. 3, for example, as shown in FIG. 5. Then, the processing system 106 can determine, based on the signal 109, whether or not a card is inserted in the IC slot 108. When a card is inserted in the IC slot 108, the processing system 106 can read data from the card and can transmit card data to the host device via a host interface (not shown), if the reader device 300 is connected to the host device, or in some embodiments can store the card data in a memory of the processing system 106 for later transmission to the host device, e.g., if the card reader is not connected to the host device or the host device is not ready to receive the card data.

Figure 7:
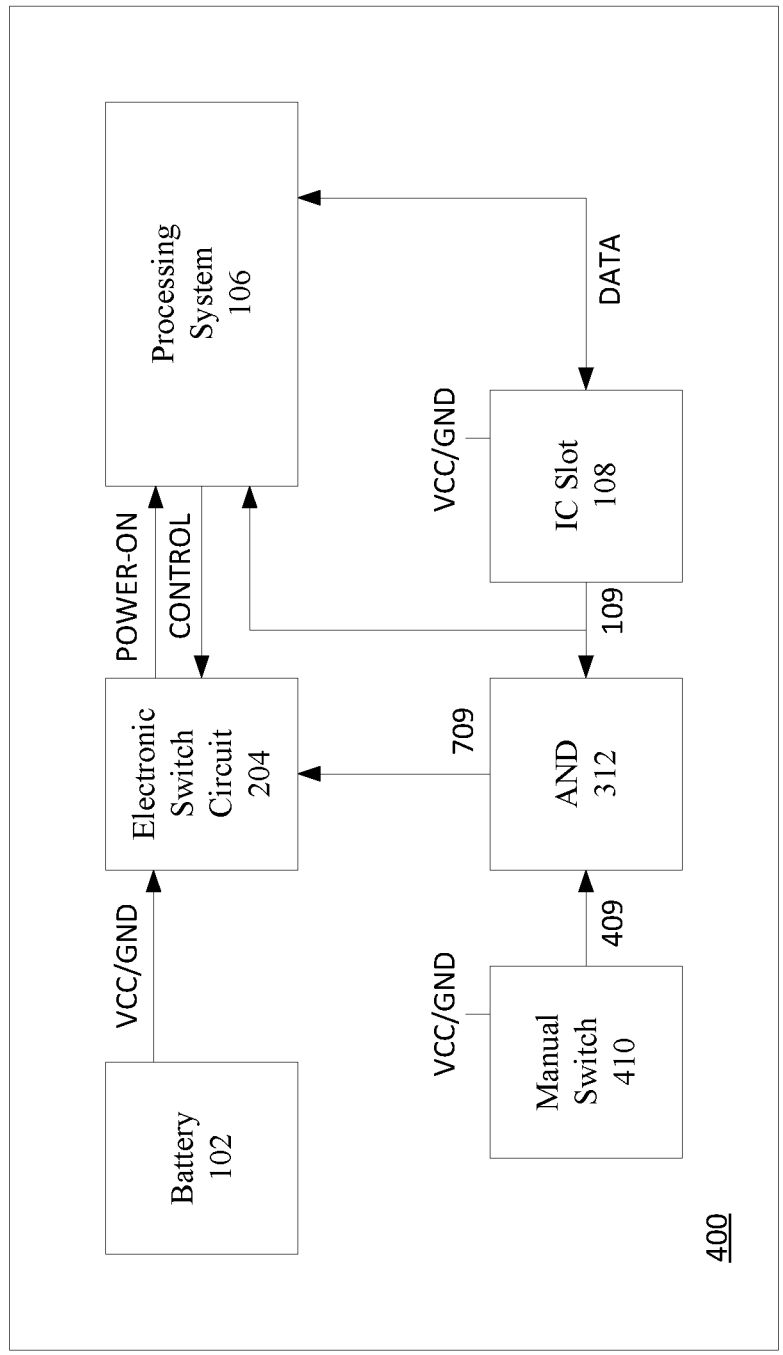
FIG. 7 is a schematic block diagram of a reader device 400 in which power-on requires operation of a manual power switch while a card is inserted in the IC slot, in accordance with a third exemplary embodiment.

FIG. 7 is a schematic block diagram of a reader device 400 in which power-on requires operation of a manual power switch while a card is inserted in the IC slot, in accordance with a third exemplary embodiment. Here, as in FIG. 2, power is provided to the normally-open card detection device of the IC slot 108 such that, when a card is inserted in IC slot 108 and the card detection device is closed, signal 109 is generated. Separately, manual power switch 410 provides signal 409 when the user operates the manual power switch 410. Signals 109 and 409 are provided to an AND circuit 312. When both signals 109 and 409 are present, signal 709 is generated to operate electronic power switch 204 and provide a power-on signal to the processing system 106. In essence, the signal 709 replaces the momentary normally-open push-button switch (S1) of the manual power switch circuit 104 of FIG. 3, for example, as shown in FIG. 5. Then, the processing system 106 can determine, based on the signal 109, whether or not a card is inserted in the IC slot 108. When a card is inserted in the IC slot 108, the processing system 106 can read data from the card and can transmit card data to the host device via a host interface (not shown), if the reader device 400 is connected to the host device, or in some embodiments can store the card data in a memory of the processing system 106 for later transmission to the host device, e.g., if the card reader is not connected to the host device or the host device is not ready to receive the card data.

Figure 8:
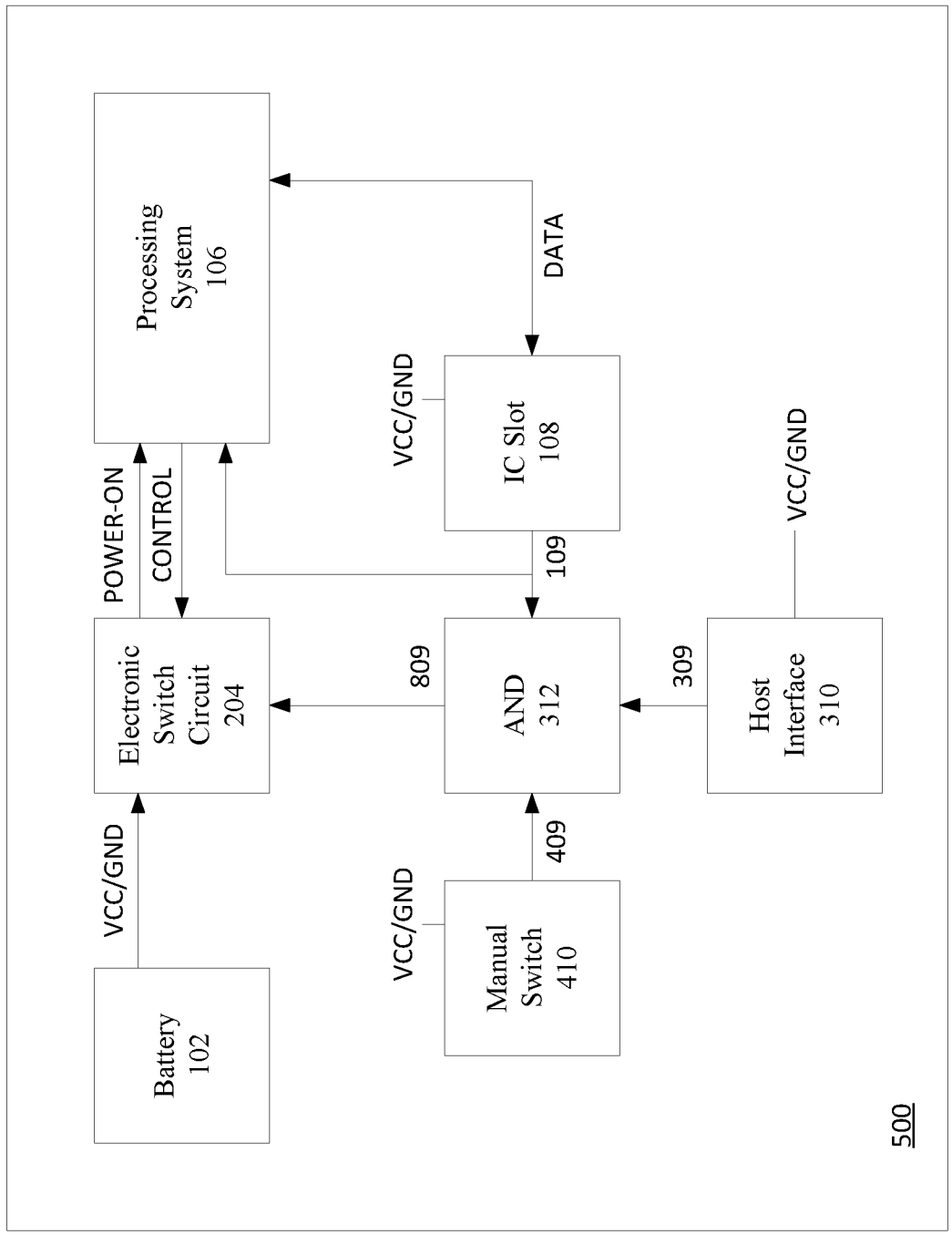
FIG. 8 is a schematic block diagram of a reader device 500 in which power-on requires operation of a manual power switch while a card is inserted in the IC slot and the reader device is connected to the host device, in accordance with a fourth exemplary embodiment.

FIG. 8 is a schematic block diagram of a reader device 500 in which power-on requires operation of a manual power switch while a card is inserted in the IC slot and the reader device is connected to the host device, in accordance with a fourth exemplary embodiment. Here, as in FIG. 2, power is provided to the normally-open card detection device of the IC slot 108 such that, when a card is inserted in IC slot 108 and the card detection device is closed, signal 109 is generated. Separately, the host device can provide a signal 309 when the reader device is connected to the host device via host interface 310 (e.g., through the audio jack, lightning jack for iOS devices, USB, etc.). For example, host device may provide a signal when it is ready to receive card data from the reader device 500. Separately, manual power switch 410 provides signal 409 when the user operates the manual power switch 410. Signals 109, 309, and 409 are provided to an AND circuit 312. When all three signals 109, 309, and 409 are present, signal 809 is generated to operate electronic power switch 204 and provide a power-on signal to the processing system 106. In essence, the signal 809 replaces the momentary normally-open push-button switch (S1) of the manual power switch circuit 104 of FIG. 3, for example, as shown in FIG. 5. Then, the processing system 106 can determine, based on the signal 109, whether or not a card is inserted in the IC slot 108. When a card is inserted in the IC slot 108, the processing system 106 can read data from the card and can transmit card data to the host device via a host interface (not shown), if the reader device 400 is connected to the host device, or in some embodiments can store the card data in a memory of the processing system 106 for later transmission to the host device, e.g., if the card reader is not connected to the host device or the host device is not ready to receive the card data.

It should be noted that the processing system 106 typically includes a processor (e.g., a microprocessor or microcontroller with memory and other peripherals, and/or application-specific hardware) configured accordingly to perform device functions. For example the processing system 106 is typically configured to read card data from the card and process the card data, which may include encrypting the card data and either storing the encrypted data or transmitting the encrypted data to the host device along with additional data relating to the reader device and/or transaction. In some embodiments, the processing system 106 includes other user interface devices (e.g., a keypad, a display screen, a touchscreen, etc.) and can be configured to present information to the user and/or accept inputs from the user via the user interface devices.

Importantly, the processing system 106 can be configured to turn off the reader device after card data has been stored or transmitted to the host device, e.g., upon receiving a signal from the host device indicating that the card data has been successfully received by the host device (e.g., the host device may send an acknowledgment to the reader along with a beep command and a power-off command), or automatically by the processing system 106 upon completion of storing card data for later transmission. It should be noted that the reader device can be turned off even if the card remains inserted in the IC slot 108.

Thus, the reader devices of the types described with reference to FIGS. 4-8 can be powered on for a minimal amount of time, starting no earlier than insertion of the card and powering down after the card data has been read and processed, thereby providing improved power savings and reduced transaction times. For example, card data could be collected and processed, and the reader powered down, before the host system is ready to complete the transaction using the card data. As discussed above, in some situations (e.g., when the reader device is not connected to the host device), the card data may be stored locally by the reader device for later transmission to the host device. Typically, the card data would be stored in encrypted form. Also, the card data may be stored with a timestamp and deleted after either being transmitted to the host device or being stored for more than a predetermined amount time based on the timestamp.

In some embodiments, the reader device firmware run by the processing system 106 may utilize a "thin" client architecture so as to omit a full operating system, thereby providing very fast power-up and initialization of the reader device. It is expected that this fast power-up and initialization, together with "quick chip" reading and processing of the card data followed by virtually immediate power-down of the reader device, will result in a total transaction time below around 8 to 10 seconds (which is below the typical time that consumers are experiencing with "non Quick chip" EMV transactions) and perhaps could be reduced to under 3 seconds and perhaps under 2 seconds in some situations. Together with use of a low-power microcontroller, per-transaction power consumption can be very low, thereby significantly extending the time between recharge cycles and in some cases making it practical to possibly return to the use of non-rechargeable batteries, which can be a substantial cost saving.

Exemplary embodiments described herein should be particularly useful for "chip-only" reader devices. With the migration of the market to EMV, as of the end of 2017, more than 95% of transactions are already EMV (when the reader device is EMV capable). MSR capabilities are being phased out. For example, Mastercard has already released information for the European market that MSR is no longer required in reader devices. Also, there currently is no mandate that reader devices support contactless reading capabilities. Thus, it becomes possible to consider introducing chip-only reader devices, i.e., having only chip-reading capabilities without MSR or contactless capabilities that generally require that the reader device be powered on for a longer amount of time.

That being said, the present invention is not limited to chip-only reader devices. For example, reader devices could include circuitry of the type described herein that powers on the reader device when a card is inserted in the IC slot, and the reader device also could include other circuitry that powers on the reader device for other functions such as MSR or contactless transactions (e.g., a power on switch/button).

Additionally or alternatively, some reader devices include a slot for MSR transactions, and power-on circuitry of the type described herein could be used to power on the reader device when the card is inserted in the slot (e.g., the reader device may be powered on when the card is inserted, and the user may have to wait until the reader device is operational and provides a signal, such as audible or visual signal, for the user to remove the card and effectuate the MSR transaction).

It should be noted that embodiments are not limited to any particular type of reader device or reader device application. Thus, for example, embodiments can include reader devices that connect to a host device using any of wide range of technologies (e.g., USB, Bluetooth, audio jack, lightning, Wi-Fi, infrared, cellular, or other communication technology). Embodiments can include portable devices or stationary devices. Embodiments can include reader devices that are used in or with other products such as vending machines, appliances (e.g., Laundromat washers and dryers), kiosks, access/entry systems, etc. The described power-on and/or power-off controls based on insertion of the card into the reader device can be used to turn on a device or device circuitry to read card data and then power down the device or device circuitry when processing is completed, thereby allowing for power savings benefits to be applied to a wide range of devices, even devices that are plugged-in rather than battery-powered.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the-shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the reader devices described herein) are necessarily non-conventional because, absent special programming or configuration, the conventional components do not inherently perform the described non-conventional methods.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A reader device comprising a power control circuit configured to power-on a processing system of the reader device upon insertion of a card in a card slot.

P2. A reader device comprising a power control circuit configured to power-on a processing system of the reader device when a card is inserted in a card slot and the reader device is connected to a host device.

P3. A reader device comprising a power control circuit configured to power-on a processing system of the reader device when a card is inserted in a card slot and a switch is operated by a user.

P4. A reader device comprising a power control circuit configured to power-on a processing system of the reader device when a card is inserted in a card slot, the reader device is connected to a host device, and a switch is operated by a user.

P5. A reader device as in one of claims P1-P4, wherein the processing system is configured to power down the reader device after storing card data.

P6. A reader device as in one of claims P1-P4, wherein the processing system is configured to power down the reader device after transmitting card data to the host device.

P7. A reader device as in one of claims P1-P4, wherein the processing system is configured to power down the reader device after transmitting card data to the host device and receiving a power-down command from the host device.

P8. A reader device as in one of claims P1-P7, wherein the reader device is a chip-only reader device.

P9. A reader device as in one of claims P1-P7, wherein the power-control circuit includes a card detection device.

P10. A reader device according to claim P9, wherein the card detection device is a normally-open switch that is closed when the card is inserted in the card slot.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A card reader device comprising:
   a card slot;
   a card detection device that selectively generates a signal when a card is inserted in the card slot and is engaged with the card detection device;
   a processing system; and
   a power control circuit configured to physically provide power to the processing system upon insertion of a card in the card slot and engagement of the card with the card detection device, wherein the processing system is configured to power off the card reader device upon completion of reading and processing card data while the card remains inserted in the card slot and engaged with the card detection device, and wherein the power control circuit requires disengagement of the card from the card detection device in order to provide power to the processing system upon subsequent engagement of a subsequent card with the card detection device.

2. A card reader device according to claim 1, wherein the processing system is configured to power off the reader device after storing the card data.

3. A card reader device according to claim 1, wherein the processing system is configured to power off the reader device upon completion of transmitting the card data to a host device.

4. A card reader device according to claim 1, wherein the processing system is configured to power off the reader device after transmitting the card data to a host device and receiving a power-down command from the host device.

5. A card reader device according to claim 1, wherein the reader device is a chip-only reader device.

6. A card reader device according to claim 1, wherein the card detection device includes a normally-open switch that is closed when the card is inserted in the card slot and engaged with the card detection device.

7. A card reader device comprising:
a host device interface;
a card slot;
a card detection device that selectively generates a signal when a card is inserted in the card slot and is engaged with the card detection device;
a processing system; and
a power control circuit configured to physically provide power to the processing system only when both (1) a card is inserted in the card slot and engaged with the card detection device and (2) the reader device is connected to a host device via the host device interface.

8. A card reader device according to claim 7, wherein the processing system is configured to power off the reader device after storing card data.

9. A card reader device according to claim 7, wherein the processing system is configured to power off the reader device upon completion of transmitting card data to a host device.

10. A card reader device according to claim 7, wherein the processing system is configured to power off the reader device after transmitting card data to a host device and receiving a power-down command from the host device.

11. A card reader device according to claim 7, wherein the reader device is a chip-only reader device.

12. A card reader device according to claim 7, wherein the card detection device includes a normally-open switch that is closed when the card is inserted in the card slot and engaged with the card detection device.

13. A card reader device according to claim 7, wherein the host device interface is one of (a) a wireless interface or (b) a physical interface.

14. A card reader device according to claim 7, wherein the power control circuit is configured to physically provide power to the processing system only when a user-operable switch of the card reader device is operated by a user while both (1) the card is inserted in the card slot and engaged with the card detection device and (2) the reader device is connected to the host device via the host device interface.

15. A card reader device comprising:
a user-operable switch;
a card slot;
a card detection device that selectively generates a signal when a card is inserted in the card slot and is engaged with the card detection device;
a processing system; and
a power control circuit configured to physically provide power to the processing system only when the user-operable switch of the card reader device is operated by a user while a card is inserted in the card slot and engaged with the card detection device.

16. A card reader device according to claim 15, wherein the processing system is configured to power off the reader device after storing card data.

17. A card reader device according to claim 15, wherein the processing system is configured to power off the reader device upon completion of transmitting card data to a host device.

18. A card reader device according to claim 15, wherein the processing system is configured to power off the reader device after transmitting card data to a host device and receiving a power-down command from the host device.

19. A card reader device according to claim 15, wherein the reader device is a chip-only reader device.

20. A card reader device according to claim 15, wherein the card detection device includes a normally-open switch that is closed when the card is inserted in the card slot and engaged with the card detection device.

21. A card reader device according to claim 15, wherein the power control circuit is configured to physically provide power to the processing system only when the user-operable switch of the card reader device is operated by the user while (1) the card is inserted in the card slot and engaged with the card detection device and (2) the reader device is connected to a host device via a host device interface.

* * * * *